United States Patent
Imamoto

(10) Patent No.: US 11,021,500 B2
(45) Date of Patent: Jun. 1, 2021

(54) PROCESS FOR PREPARING OPTICALLY ACTIVE 2,3-BISPHOSPHINO-SUBSTITUTED QUINOXALINES

(71) Applicant: Nippon Chemical Industrial Co., Ltd., Tokyo (JP)

(72) Inventor: Tsuneo Imamoto, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/636,479

(22) PCT Filed: Jul. 24, 2018

(86) PCT No.: PCT/JP2018/027702
§ 371 (c)(1),
(2) Date: Feb. 4, 2020

(87) PCT Pub. No.: WO2019/031232
PCT Pub. Date: Feb. 14, 2019

(65) Prior Publication Data
US 2020/0247833 A1    Aug. 6, 2020

(30) Foreign Application Priority Data
Aug. 8, 2017  (JP) .............. JP2017-153422

(51) Int. Cl.
  C07D 241/44   (2006.01)
  C07F 9/6509   (2006.01)
  C07F 1/00     (2006.01)

(52) U.S. Cl.
  CPC ........ *C07F 9/650994* (2013.01); *C07F 1/005* (2013.01)

(58) Field of Classification Search
  CPC .................................................. C07D 241/44
  USPC ....................................................... 544/353
  See application file for complete search history.

(56) References Cited

U.S. PATENT DOCUMENTS

| | | | |
|---|---|---|---|
| 2007/0021610 A1 | 1/2007 | Imamoto et al. | |
| 2012/0252762 A1* | 10/2012 | Oohara ............... | A61K 31/675 514/85 |

FOREIGN PATENT DOCUMENTS

| | | | |
|---|---|---|---|
| CN | 102464675 A | 5/2012 | |
| JP | 2007-56007 A | 3/2007 | |
| JP | 2007-320909 A | 12/2007 | |
| JP | 2011-219413 A | 11/2011 | |
| WO | 2011/078121 A1 | 6/2011 | |
| WO | 2011/078122 A1 | 6/2011 | |
| WO | 2011/129365 A1 | 10/2011 | |

OTHER PUBLICATIONS

Imamoto, et al. Journal of the American Chemical Society, 134(3), 2012, 1754-1769.*
International Search Report dated Sep. 4, 2018, issued in counterpart International Application No. PCT/JP2018/027702, with English Translation. (4 pages).
Imamoto et al., "An Air-stable P-Chiral Phosphine Ligand for Highly Enantioselective Transition-Metal-Catalyzed Reactions", Journal of the American Chemical Society, (2005), 127, pp. 11934-11935. (2 pages).
Liu et al., "A new and convenient approach for the synthesis of P-stereogenic intermediates bearing a tert-butly (methyl) phosphino group", Research on Chemical Intermediates, Apr. 7, 2017, 43 (8), pp. 4959-4966, ISSN 0922-6168. (8 pages).

* cited by examiner

*Primary Examiner* — Douglas M Willis
(74) *Attorney, Agent, or Firm* — Westerman, Hattori, Daniels & Adrian, LLP

(57) ABSTRACT

There is provided a method for producing a 2,3-bisphosphinopyrazine derivative, the method comprising a first step of adding a base to a liquid comprising: 2,3-dihalogenopyrazine represented by the following general formula (1); a hydrogen-phosphine borane compound represented by the following general formula (2); and a deboranating agent, and allowing the resultant to react to thereby obtain the 2,3-bisphosphinopyrazine derivative represented by the following general formula (3). According to the present invention, a method for producing the industrially advantageous 2,3-bisphosphinopyrazine derivative can be provided.

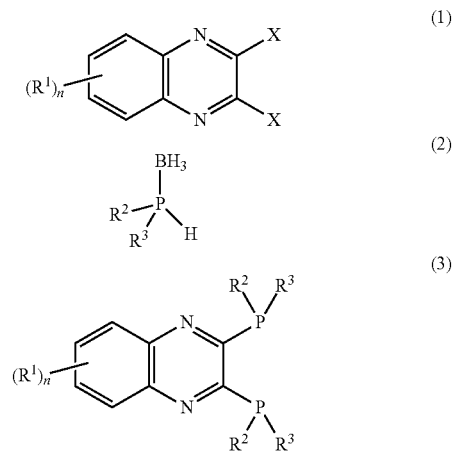

4 Claims, No Drawings

PROCESS FOR PREPARING OPTICALLY ACTIVE 2,3-BISPHOSPHINO-SUBSTITUTED QUINOXALINES

CROSS-REFERENCE OF RELATED APPLICATION

This application is a 371 of International Application No. PCT/JP2018/027702 filed Jul. 24, 2018, which claims priority of Japanese Patent Application No. 2017-153422 filed in Japan on Aug. 8, 2017, the entire contents of which are incorporated herein by reference.

TECHNICAL FIELD

The present invention relates to a method for producing 2,3-bisphosphinopyrazine derivatives. The present invention relates particularly to a method for producing a 2,3-bisphosphinopyrazine derivative useful as a ligand of a metal complex to be used as an asymmetric catalyst in an asymmetric synthesis reaction, and a ligand source and the like of a transition metal complex to be used as an anticancer drug. The present invention relates further particularly to a method for producing a phosphine transition metal complex useful as an anticancer drug.

BACKGROUND ART

Organic synthesis reactions using as their catalyst a metal complex having an optically active phosphine ligand are known for long, and since they are remarkably useful, many research results thereon have been reported. In recent years, ligands whose phosphorus atom itself is asymmetric have been developed. For example, Japanese Patent Laid-Open No. 2007-56007 and Japanese Patent Laid-Open No. 2011-219413 describe an optically active 2,3-bis(dialkylphosphino)pyrazine derivative capable of providing a metal complex exhibiting excellent catalytic performance, and a production method thereof.

Production methods described in the above publications produce an optically active substance of 2,3-bis(tert-butylmethylphosphino)quinoxaline as a target, for example, by dropping a solution containing 2,3-dichloroquinoxaline in a solution containing tert-butylmethylphosphine obtained by deprotonation of (R)-tert-butylmethylphosphine-borane and cooling the resultant to −70° C. to carry out an aromatic nucleophilic substitution reaction thereon to thereby obtain a diphosphine-borane intermediate, and thereafter deboranating the resultant.

Further International Publication No. WO2011/129365 discloses production of a 2,3-bisphosphinopyrazine derivative as a target by carrying out the steps of adding a solution containing racemic-tert-butylmethylphosphine borane to a solution containing potassium-tert-butoxide to carry out a deprotonation reaction on the racemic-tert-butylmethylphosphine borane, then adding at −10° C. the solution having been subjected to the deprotonation reaction to a solution containing 2,3-dichloroquinoxaline to carry out an aromatic nucleophilic substitution reaction thereon, and thereafter adding tetramethylethylenediamine to the solution having been subjected to the aromatic nucleophilic substitution reaction to carry out a deboranation reaction thereon.

Further Japanese Patent Laid-Open No. 2007-320909, International Publication No. WO2011/129365, International Publication No. WO2011/078122, International Publication No. WO2011/078121 and the like disclose that a phosphine transition metal complex obtained by a reaction of a 2,3-bisphosphinopyrazine derivative with a salt of a transition metal such as gold, copper or silver has excellent anticancer action.

In the production methods of Japanese Patent Laid-Open No. 2007-56007 and Japanese Patent Laid-Open No. 2011-219413, although 2,3-bis(tert-butylmethylphosphino)quinoxaline as a target is obtained in a high yield and a high purity, since the aromatic nucleophilic substitution reaction is carried out at a low temperature of −70° C. or lower, a special cooling apparatus is needed and there are needed a considerably long time until being cooled to −70° C. or lower and a considerably long time to raise the temperature to a temperature at which the deboranation reaction is then carried out, so the production methods are not industrially advantageous.

Further in the method of International Publication No. WO2011/129365, although the reaction can be carried out at a relatively industrially advantageous temperature, since the method consists of a plurality of steps, the method needs a plurality of facilities corresponding thereto and processes also become complicated, so the method is not industrially advantageous.

Therefore, an object of the present invention is to provide a method for producing an industrially advantageous 2,3-bisphosphinopyrazine derivative. Further an object of the present invention is to provide a method for producing a 2,3-bisphosphinopyrazine derivative, wherein an optically active 2,3-bis(dialkylphosphino)pyrazine derivative can be obtained in a highly optical purity and in a high yield in production thereof. Further an object of the present invention is to provide a method for industrially advantageously producing a phosphine transition metal complex useful as an anticancer drug.

SUMMARY OF THE INVENTION

As a result of exhaustive studies, the present inventors have found that by adding a base to a solution containing 2,3-dihalogenopyrazine, a hydrogen-phosphine borane compound and a deboranating agent, a 2,3-bisphosphinopyrazine derivative as a target can be obtained at an industrially advantageous temperature and at a stretch, that an optically active 2,3-bis(dialkylphosphino)pyrazine derivative having a high optical purity can be obtained in a high yield in production thereof even if the reaction is carried out at such a temperature, and the like; and these findings have led to the completion of the present invention.

That is, the present invention (1) is a method for producing a 2,3-bisphosphinopyrazine derivative, the method comprising a first step of adding a base to a liquid comprising: 2,3-dihalogenopyrazine represented by the following general formula (1):

[Formula 1]

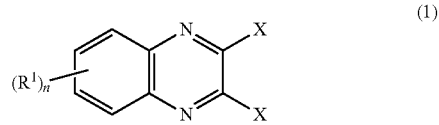

wherein X represents a halogen atom; $R^1$ represents a monovalent substituent; and n represents an integer of 0 to 4;

a hydrogen-phosphine borane compound represented by the following general formula (2):

[Formula 2]

wherein $R^2$ and $R^3$ each represent an optionally substituted straight-chain or branched alkyl group having 1 to 10 carbon atoms, an optionally substituted cycloalkyl group, an optionally substituted adamantyl group, or an optionally substituted phenyl group, and $R^2$ and $R^3$ may be the same group or different groups; and a deboranating agent,
and allowing the resultant to react to thereby obtain the 2,3-bisphosphinopyrazine derivative represented by the following general formula (3):

[Formula 3]

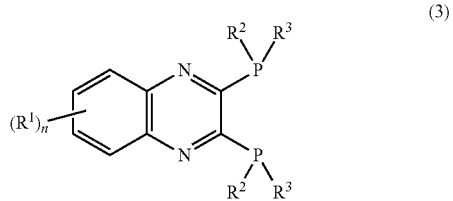

wherein $R^1$, $R^2$, $R^3$ and n are defined as above.

Further the present invention (2) provides the method for producing a 2,3-bisphosphinopyrazine derivative according to (1), wherein the hydrogen-phosphine borane compound is an optically active substance having an asymmetric center on the phosphorus atom.

Further the present invention (3) provides the method for producing a 2,3-bisphosphinopyrazine derivative according to (1) or (2), wherein $R^2$ is a t-butyl group or an adamantyl group, and $R^3$ is a methyl group.

Further the present invention (4) provides the method for producing a 2,3-bisphosphinopyrazine derivative according to any one of (1) to (3), wherein the reaction temperature is −25 to 100° C.

Further the present invention (5) provides the method for producing a 2,3-bisphosphinopyrazine derivative according to any one of (1) to (4), wherein the base is potassium-tert-butoxide.

Further the present invention (6) provides a method for producing a phosphine transition metal complex, the method comprising a first step of adding a base to a liquid comprising: 2,3-dihalogenopyrazine represented by the following general formula (1):

[Formula 1]

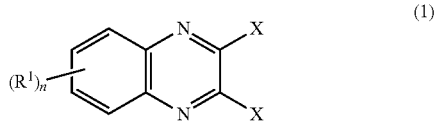

wherein X represents a halogen atom; $R^1$ represents a monovalent substituent; and n represents an integer of 0 to 4;

a hydrogen-phosphine borane compound represented by the following general formula (2):

[Formula 2]

wherein $R^2$ and $R^3$ each represent an optionally substituted straight-chain or branched alkyl group having 1 to 10 carbon atoms, an optionally substituted cycloalkyl group, an optionally substituted adamantyl group, or an optionally substituted phenyl group, and $R^2$ and $R^3$ may be the same group or different groups; and a deboranating agent, and allowing the resultant to react to thereby obtain a 2,3-bisphosphinopyrazine derivative represented by the following general formula (3):

[Formula 3]

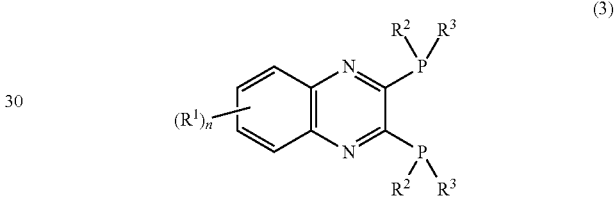

wherein $R^1$, $R^2$, $R^3$ and n are defined as above, and a second step of reacting the 2,3-bisphosphinopyrazine derivative represented by the general formula (3) with a metal salt(s) of one or two or more transition metals selected from the group consisting of gold, copper and silver to thereby obtain the phosphine transition metal complex represented by the following general formula (4):

[Formula 4]

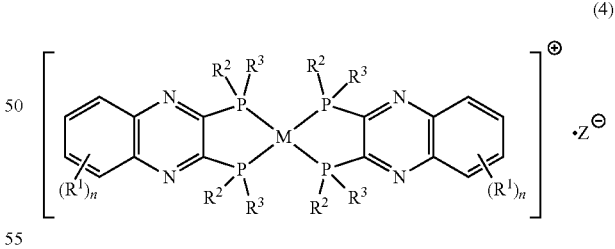

wherein $R^1$, $R^2$, $R^3$ and n are defined as above; M represents a transition metal atom selected from the group consisting of gold, copper and silver; and $Z^-$ represents an anion.

According to the present invention, a method for producing an industrially advantageous 2,3-bisphosphinopyrazine derivative can be provided. Further according to the present invention, there can be provided a method for producing a 2,3-bisphosphinopyrazine derivative wherein an optically active 2,3-bis(dialkylphosphino)pyrazine derivative having a high optical purity can be obtained in a high yield in production thereof. Further according to the present invention, a method for industrially advantageously producing a phosphine transition metal complex useful as an anticancer drug can be provided.

DETAILED DESCRIPTION OF EMBODIMENTS OF THE INVENTION

The method for producing a 2,3-bisphosphinopyrazine derivative according to the present invention is a production method thereof comprising a first step of adding a base to a liquid (hereinafter, referred to also as "liquid A") comprising: 2,3-dihalogenopyrazine represented by the following general formula (1):

[Formula 1]

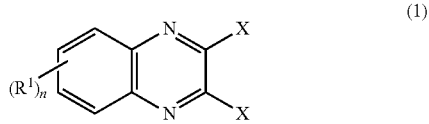

wherein X represents a halogen atom; $R^1$ represents a monovalent substituent; and n represents an integer of 0 to 4;
a hydrogen-phosphine borane compound represented by the following general formula (2):

[Formula 2]

wherein $R^2$ and $R^3$ each represent an optionally substituted straight-chain or branched alkyl group having 1 to 10 carbon atoms, an optionally substituted cycloalkyl group, an optionally substituted adamantyl group, or an optionally substituted phenyl group, and $R^2$ and $R^3$ may be the same group or different groups; and
a deboranating agent,
and allowing the resultant to react to thereby obtain the 2,3-bisphosphinopyrazine derivative represented by the following general formula (3):

[Formula 3]

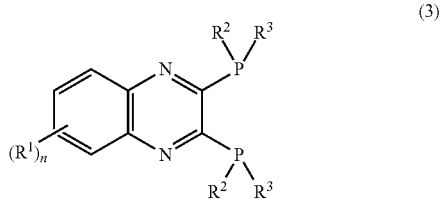

wherein $R^1$, $R^2$, $R^3$ and n are defined as above.

That is, the method for producing a 2,3-bisphosphinopyrazine derivative according to the present invention comprises the first step of adding a base to a liquid (liquid A) comprising 2,3-dihalogenopyrazine represented by the general formula (1), a hydrogen-phosphine borane compound represented by the general formula (2) and a deboranating agent, and allowing the resultant to react to thereby obtain the 2,3-bisphosphinopyrazine derivative represented by the general formula (3).

In the general formula (1), X is a halogen atom, and examples thereof include a chlorine atom, a bromine atom and an iodine atom. Among these, X is preferably a chlorine atom. Further in the general formula (1), $R^1$ represents a monovalent substituent. $R^1$ is not especially limited as long as being a monovalent substituent, and examples thereof include straight-chain or branched alkyl groups having 1 to 5 carbon atoms, a nitro group, an amino group, a hydroxyl group, a fluoro group, a chloro group, a bromo group and an iodo group. In the general formula (1), n represents an integer of 0 to 4.

The 2,3-dihalogenopyrazine represented by the general formula (1) may be a commercially available product. For example, 2,3-dichloroquinoxaline is available from Tokyo Chemical Industry Co., Ltd. The content of 2,3-dihalogenopyrazine represented by the general formula (1) in the liquid A is, based on the total amount of the liquid A, 1 to 50% by mass and preferably 5 to 20% by mass. The content of 2,3-dihalogenopyrazine represented by the general formula (1) in the liquid A is preferably in the above range, in that the 2,3-bisphosphinopyrazine derivative high in reaction rate, excellent in productivity and excellent in quality can thereby be obtained.

In the general formula (2), $R^2$ and $R^3$ each represent an optionally substituted straight-chain or branched alkyl group having 1 to 10 carbon atoms, an optionally substituted cycloalkyl group, an optionally substituted adamantyl group, or an optionally substituted phenyl group, and $R^2$ and $R^3$ may be the same group or different groups.

Examples of the alkyl group of $R^2$ and $R^3$ include a methyl group, an ethyl group, an isopropyl group, a n-propyl group, an isobutyl group, a n-butyl group, a sec-butyl group, a tert-butyl group, an isoheptyl group, a n-heptyl group, an isohexyl group and a n-hexyl group. Further the cycloalkyl group of $R^2$ and $R^3$ includes a cyclopentyl group and a cyclohexyl group. Further in the case where $R^2$ or $R^3$ is a cycloalkyl group having a substituent, an adamantyl group having a substituent, or a phenyl group having a substituent, the substituent includes alkyl groups, a nitro group, an amino group, a hydroxyl group, alkoxy groups, a fluoro group, a chloro group, a bromo group and an iodo group.

In the case where the 2,3-bisphosphinopyrazine derivative is used as an application of an asymmetric catalyst, in the method for producing a 2,3-bisphosphinopyrazine derivative according to the present invention, the hydrogen-phosphine borane compound represented by the general formula (2) is preferably an optically active substance having an asymmetric center on the phosphorus atom. The hydrogen-phosphine borane compound represented by the general formula (2) being an optically active substance having an asymmetric center on the phosphorus atom is preferably a hydrogen-phosphine borane compound in which in the general formula (2), $R^2$ is a t-butyl group or an adamantyl group, and $R^3$ is a methyl group.

The hydrogen-phosphine borane compound represented by the general formula (2) is produced by a known method. Examples of the production method of the hydrogen-phosphine borane compound represented by the general formula (2) include methods described in Japanese Patent Laid-Open Nos. 2001-253889, 2003-300988, 2007-70310 and 2010-138136 and J. Org. Chem. 2000, vol. 65, p. 4185-4188. It is preferable that the content of the hydrogen-phosphine borane compound represented by the general formula (2) in the liquid A be, per mol of 2,3-dihalogenopyrazine represented by the general formula (1), 2.0 to 4.0 mol, preferably 2.1 to 3.0 mol, in that thereby the economic efficiency is high and the reactivity is high.

Examples of the deboranating agent in the first step include N,N,N',N'-tetramethylethylenediamine (TMEDA), triethylenediamine (DABCO) and triethylamine. It is preferable that the content of the deboranating agent in the liquid A be, per mol of the hydrogen-phosphine borane compound represented by the general formula (2), 2 to 20 mol, preferably 3 to 10 mol, in that thereby the economic efficiency is high and the reactivity is high.

The liquid A is a liquid in which 2,3-dihalogenopyrazine represented by the general formula (1), a hydrogen-phosphine borane compound represented by the general formula (2) and a deboranating agent are dissolved or dispersed in a solvent.

The solvent to be used for the liquid A is not especially limited as long as being capable of dissolving or dispersing 2,3-dihalogenopyrazine represented by the general formula (1) and being a solvent inactive to the 2,3-dihalogenopyrazine represented by the general formula (1). Examples of the solvent to be used for the liquid A include tetrahydrofuran, N,N-dimethylformamide, cyclopentyl methyl ether, diethyl ether, dibutyl ether, dioxane, hexane and toluene. These solvents are used singly or as a mixed solvent. The liquid A may be in a solution state in which the 2,3-dihalogenopyrazine represented by the general formula (1), the hydrogen-phosphine borane compound represented by the general formula (2) and the deboranating agent are completely dissolved in the solvent, or in a slurry state in which part of or the whole of the 2,3-dihalogenopyrazine represented by the general formula (1), the hydrogen-phosphine borane compound represented by the general formula (2) and the deboranating agent is not dissolved but dispersed in the solvent.

Examples of the base in the first step include n-butyllithium, lithium diisopropylamide, methylmagnesium bromide, potassium-tert-butoxide, sodium-tert-butoxide, the Hunig base, potassium hydroxide and sodium hydroxide. Among these, the base in the first step is preferably potassium-tert-butoxide, in that the 2,3-bisphosphinopyrazine derivative excellent in reaction yield and excellent in quality can thereby be obtained.

Then, in the first step, the base is added to the liquid A and allowed to react to thereby obtain the 2,3-bisphosphinopyrazine derivative represented by the general formula (3).

In the first step, a solution (hereinafter, referred to as "liquid B") in which the base is dissolved in a solvent may be added to the liquid A, or the base may be added as a solid to the liquid A. In the first step, the liquid B is preferably added to the liquid A, in that the reaction is thereby easily controlled and the 2,3-bisphosphinopyrazine derivative stable in quality is easily obtained.

The content of the base in the liquid B is not especially limited, and it is preferable that the content be, based on the total amount of the liquid B, 1 to 50% by mass, preferably 5 to 30% by mass, in that the reactivity and the productivity are thereby high.

The solvent to be used for the liquid B is not especially limited as long as being capable of dissolving the base and being an inactive solvent. Examples of the solvent in the liquid B include tetrahydrofuran, N,N-dimethylformamide, diethyl ether, dibutyl ether, dioxane, hexane and toluene. These solvents are used singly or as a mixed solvent.

In the first step, it is preferable that the amount of the base to be added to the liquid A be, per mol of the hydrogen-phosphine borane compound represented by the general formula (2) in the liquid A, 1.0 to 1.5 mol, preferably 1.0 to 1.2 mol, in that thereby the economic efficiency is high and the reactivity is high.

In the first step, in the case where a solid or liquid base is added as the liquid B to the liquid A, or in the case where a liquid base is added directly to the liquid A, the addition rate of the base to the liquid A is not especially limited as long as the reaction heat can be controlled in the range not causing side reactions, and the addition rate of the base to the liquid A is preferably a constant rate, in that the 2,3-bisphosphinopyrazine derivative stable in quality can thereby be obtained. In the case where a solid base is added directly added to the liquid A, it is desirable that the solid base is added in portions while the situation of the reaction heat is being observed.

In the first step, the temperature (temperature of the reaction liquid) of the liquid A when the base is added to the liquid A is −25 to 100° C. In the first step, the temperature (temperature of the reaction liquid) of the liquid A when the base is added to the liquid A is preferably −25 to 50° C., in that such a temperature is industrially advantageous. Then in the case where an optically active substance is used as the hydrogen-phosphine borane compound represented by the general formula (2), and a desired optically active 2,3-bis(dialkylphosphino)pyrazine derivative is produced, in the first step, the temperature (temperature of the reaction liquid) of the liquid A when the base is added to the liquid A is preferably −25 to 20° C., in that the 2,3-bis(dialkylphosphino)pyrazine derivative having a high optical purity can thereby be obtained in a high yield.

In the first step, after the base is added to the liquid A, as required, aging can be carried out in order to complete the reaction. The aging temperature (temperature of the reaction liquid) in the case of carrying out the aging is −25 to 100° C. The aging temperature (temperature of the reaction liquid) in the case of carrying out the aging is preferably −25 to 80° C., in that such a temperature is industrially advantageous. Then in the case where an optically active substance is used as the hydrogen-phosphine borane compound represented by the general formula (2), and a desired optically active 2,3-bis(dialkylphosphino)pyrazine derivative is produced, the aging temperature (temperature of the reaction liquid) in the case of carrying out the aging is preferably −25 to 30° C., in that the 2,3-bis(dialkylphosphino)pyrazine derivative having a high optical purity can thereby be obtained in a high yield.

By thus carrying out the first step, the 2,3-bisphosphinopyrazine derivative represented by the general formula (3) is formed in the reaction liquid.

After the reaction is carried out in the first step, as required, on the reaction liquid or the 2,3-bisphosphinopyrazine derivative represented by the general formula (3) separated from the reaction liquid, refinement such as liquid separation and washing, extraction, crystallization, distillation, sublimation or column chromatography may be carried out.

One feature of the production method of the 2,3-bisphosphinopyrazine derivative according to the present invention is to carry out the reaction by adding the base to the liquid A in the first step, and can raise the reaction temperature higher up to an industrially advantageous temperature than conventional methods.

Further in the conventional production methods, for example, in production methods of Japanese Patent Laid-Open No. 2007-56007 and Japanese Patent Laid-Open No. 2011-219413, a deboranating agent is added, for deboranation reaction, to a reaction liquid after an aromatic nucleophilic substitution reaction is carried out, wherein a 2,3-bisphosphinopyrazine derivative as a target is produced thus through substantially two steps; and in the production method of International Publication No. WO2011/129365, deprotonation of tert-butylmethylphosphine borane, aromatic nucleophilic substitution reaction and deboranation reaction are carried out, wherein a 2,3-bisphosphinopyrazine derivative as a target is produced thus through substantially three steps. By contrast therewith, since in the production method of a 2,3-bisphosphinopyrazine derivative according to the present invention, the 2,3-bisphosphinopyrazine derivative as a target can be obtained at stretch from 2,3-dihalogenopyrazine and a hydrogen-phosphine, the production method of a 2,3-bisphosphinopyrazine derivative according to the present invention is industrially more advantageous than the conventional production methods.

In the production method of a 2,3-bisphosphinopyrazine derivative according to the present invention, in the case of producing an optically active 2,3-bisphosphinopyrazine derivative, a 2,3-bisphosphinopyrazine derivative having a high optical purity can be obtained in a high yield.

Among 2,3-bisphosphinopyrazine derivatives represented by the general formula (3) obtained by the production method of a 2,3-bisphosphinopyrazine derivative according to the present invention, an optically active substance of a compound having different groups as $R^2$ and $R^3$ can form as a ligand a complex with a transition metal. The complex is useful as an asymmetric synthesis catalyst. Examples of the asymmetric synthesis include asymmetric hydrogenation reaction, asymmetric 1,4-addition reaction to an electron-deficient olefin using an organoboronic acid, asymmetric hydrosilylation reaction and asymmetric cyclization.

Examples of the transition metal capable of forming the complex include rhodium, ruthenium, iridium, palladium, platinum, nickel and iron. Preferable metals are palladium and rhodium. A method for forming a complex with rhodium by using as its ligand a 2,3-bis(dialkylphosphino)pyrazine derivative represented by the general formula (3) may be according to a method described, for example, in the Fourth Series of Experimental Chemistry (edited by the Chemical Society of Japan, published by Maruzen Publishing Co., Ltd., vol. 18, pp. 327-353).

Among 2,3-bisphosphinopyrazine derivatives represented by the general formula (3) obtained by the production method of a 2,3-bisphosphinopyrazine derivative according to the present invention, a compound having the same group as $R^2$ and $R^3$, or an optically active substance or a racemic form of a compound having different groups as $R^2$ and $R^3$ is useful also as a ligand source of a phosphine transition metal complex to be used as an anticancer drug.

Then, a method for producing a phosphine transition metal complex represented by the general formula (4) will be described. The production method of a phosphine transition metal complex according to the present invention is a method for producing the phosphine transition metal complex, the method comprising a first step of adding a base to a liquid comprising: 2,3-dihalogenopyrazine represented by the following general formula (1):

[Formula 1]

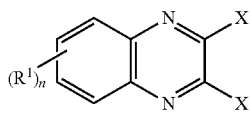

(1)

wherein X represents a halogen atom; $R^1$ represents a monovalent substituent; and n represents an integer of 0 to 4;

a hydrogen-phosphine borane compound represented by the following general formula (2):

[Formula 2]

(2)

wherein $R^2$ and $R^3$ each represent an optionally substituted straight-chain or branched alkyl group having 1 to 10 carbon atoms, an optionally substituted cycloalkyl group, an optionally substituted adamantyl group, or an optionally substituted phenyl group, and $R^2$ and $R^3$ may be the same group or different groups; and a deboranating agent, and allowing the resultant to react to thereby obtain a 2,3-bisphosphinopyrazine derivative represented by the following general formula (3):

[Formula 3]

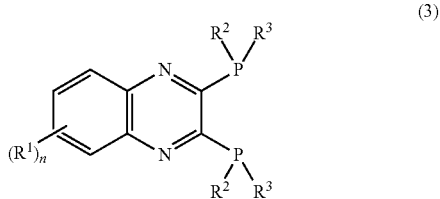

(3)

wherein $R^1$, $R^2$, $R^3$ and n are defined as above, and a second step of reacting the 2,3-bisphosphinopyrazine derivative represented by the general formula (3) with a metal salt(s) of one or two or more transition metals selected from the group consisting of gold, copper and silver to thereby obtain the phosphine transition metal complex represented by the following general formula (4):

[Formula 4]

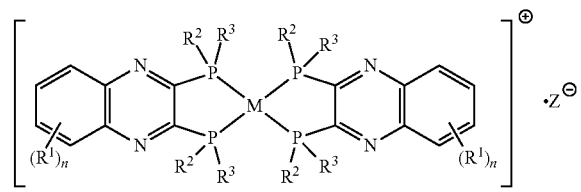

(4)

wherein $R^1$, $R^2$, $R^3$ and n are defined as above; M represents a transition metal atom selected from the group consisting of gold, copper and silver; and $Z^-$ represents an anion.

That is, the production method of a phosphine transition metal complex according to the present invention comprises the first step in the production method of a 2,3-bisphosphinopyrazine derivative according to the present invention, and the second step of reacting the 2,3-bisphosphinopyrazine derivative represented by the general formula (3)

obtained by carrying out the first step with a metal salt(s) of one or two or more transition metals selected from the group consisting of gold, copper and silver to thereby obtain the phosphine transition metal complex represented by the general formula (4).

$R^1$, $R^2$, $R^3$ and n in the general formula (4) correspond to $R^1$ and n in the general formula (1) and $R^2$ and $R^3$ in the general formula (2). M in the general formula (4) represents one or two or more transition metal atoms selected from the group consisting of gold, copper and silver. In the general formula (4), $Z^-$ represents an anion. Examples of the $Z^-$ include chloride ion, bromide ion, iodide ion, tetrafluoroborate ion, hexafluorophosphate ion and perchlorate ion.

The metal salt of the transition metal in the second step is a salt of gold, copper or silver. Examples of the metal salt of the transition metal in the second step include halides, nitrate salts, perchlorate salts, tetrafluoroborate salts and hexafluorophosphate salts of these metals. The valence of the metal of the transition metal salt in the second step is monovalence. The metal salt of the transition metal in the second step, since being a metal salt(s) of one or two or more transition metals selected from the group consisting of gold, copper and silver, may be a metal salt of one of gold, copper or silver, or may be a combination of two or more metal salts in which either ones or both of metal species and anions are different.

Among the metal salts of the transition metals in the second step, examples of preferable gold salts include chloroauric acid, gold(I) chloride and tetrabutylammonium chloride.gold(I) chloride (see "the Fifth Series of Experimental Chemistry 21", edited by the Chemical Society of Japan, published by Maruzen Publishing Co., Ltd., published on Mar. 30, 2004, pp. 366-380, Aust. J. Chemm., 1997, 50, pp. 775-778). Among the metal salts of the transition metals in the second step, examples of preferable copper salts include copper(I) chloride, copper(I) bromide and copper(I) iodide (see "the Fifth series of Experimental Chemistry 21", edited by the Chemical Society of Japan, published by Maruzen Publishing Co., Ltd., published on Mar. 30, 2004, pp. 349-361). Among the metal salts of the transition metals in the second step, examples of preferable silver salts include silver(I) chloride, silver(I) bromide and silver(I) iodide (see "the Fifth series of Experimental Chemistry 21", edited by the Chemical Society of Japan, published by Maruzen Publishing Co., Ltd., published on Mar. 30, 2004, pp. 361-366). Here, the metal salts of the transition metals in the second step may be anhydrous ones or hydrous ones.

Then, in the second step, the 2,3-bisphosphinopyrazine derivative represented by the general formula (3) is reacted with a metal salt(s) of one or two or more transition metals selected from the group consisting of gold, copper and silver. In the second step, the amount of the 2,3-bisphosphinopyrazine derivative represented by the general formula (3) to be reacted with the metal salt(s) of one or two or more transition metals selected from the group consisting of gold, copper and silver is not especially limited, and the amount of the 2,3-bisphosphinopyrazine derivative represented by the general formula (3) is, per mol of metal salt(s) of one or two or more transition metals selected from the group consisting of gold, copper and silver (in the case of a plurality of metal salts, mol of the total molar number of the plurality of the metal salts), preferably 1 to 5 mol and more preferably 1.8 to 2.2 mol.

In the second step, the reaction of the 2,3-bisphosphinopyrazine derivative represented by the general formula (3) with the metal salt(s) of one or two or more transition metals selected from the group consisting of gold, copper and silver can be carried out in a solvent such as acetone, acetonitrile, methanol, ethanol, tetrahydrofuran, dichloromethane or chloroform. In the second step, the reaction temperature is preferably −20 to 60° C. and more preferably 0 to 25° C.; and the reaction time is preferably 0.5 to 48 hours and more preferably 1 to 3 hours.

By thus carrying out the second step, the phosphine transition metal complex represented by the general formula (4) is obtained.

After the second step is carried out, as required, common refinement can be carried out.

In the case where the phosphine transition metal complex represented by the general formula (4) is a phosphine transition metal complex having different groups as $R^2$ and $R^3$, since the phosphine transition metal complex represented by the general formula (4) has four asymmetric phosphorus atoms, a number of isomers exist, but in the production method of the phosphine transition metal complex according to the present invention, the obtained phosphine transition metal complex may be a mixture containing isomers, and the combination of configurations on the phosphorus atoms is not especially limited. Specifically, configurations on the phosphorus atoms of these isomers may be constituted of: simple enantiomers, like (R,R)(R,R) or (S,S)(S,S); racemic forms of ligands, like (R,R)(S,S); mutually meso forms, like (R,S)(S,R); or one enantiomer and a meso form thereof, like (R,R) (S,R).

In the 2,3-bisphosphinopyrazine derivative represented by the general formula (3) to become a starting material of the second step in the production method of the phosphine transition metal complex according to the present invention, the two phosphorus atoms become chiral centers due to that $R^2$ and $R^3$ are different groups. Consequently, for the 2,3-bisphosphinopyrazine derivative, three isomers having different configurations of an (R,R) form, an (S,S) form and an (R,S) form exist. Among these three isomers, the (R,S) form is a meso form, and an equimolar mixture of the (R,R) form and the (S,S) form becomes a racemic form. After desired isomers are obtained in the first step, by using one or two or more of these isomers in the second step, phosphine transition metal complexes having steric structures as targets can be obtained singly or as a mixture (see, for example, Japanese Patent Laid-Open No. 2007-320909, International Publication Nos. WO2011/078121, WO2011/072902 and WO2011/129365).

After the production method of a phosphine transition metal complex according to the present invention is carried out to thereby obtain the phosphine transition metal complex represented by the general formula (4), the anion of the phosphine transition metal complex represented by the general formula (4) can be changed to another desired anion. For example, first, according to the production method of a phosphine transition metal complex according to the present invention, a phosphine transition metal complex whose $Z^-$ in the general formula (4) is a halide ion is obtained, and then, by reacting the phosphine transition metal complex with an inorganic acid, organic acid or alkali metal salt thereof having the desired anion in a suitable solvent, a phosphine transition metal complex whose $Z^-$ is the desired anion can be obtained. The details of such a method are described, for example, in Japanese Patent Laid-Open Nos. 10-147590, 10-114782, 61-10594 and the like.

There is useful as an anticancer drug, the phosphine transition metal complex represented by the general formula (4) obtained by carrying out the production method of a phosphine transition metal complex according to the present

EXAMPLES

Hereinafter, the present invention will be described by way of Examples, but the present invention is not any more limited to these Examples.

Synthesis of (S)-tert-butylmethylphosphine-borane

Benzoyl chloride (2.1 mL, 18 mmol) was dropped at 0° C. under stirring in a solution in which an (S)-tert-butyl(hydroxymethyl)methylphosphine-borane (92% ee, 2.22 g, 15.0 mmol) was dissolved in 10 ml of pyridine. Then, the reaction mixture liquid was heated to room temperature. After an elapse of 1 hour, the reaction mixture liquid was diluted with water, and three times extracted with ether. An obtained organic layer was washed with a 1M hydrochloric acid, a sodium hydrogencarbonate aqueous solution and a saturated brine each, and dehydrated with sodium sulfate. After the solvent was removed, the residue was refined by column chromatography of silica gel (mobile phase: hexane/ethyl acetate=3/1). A colorless solid was obtained, and the solid was twice recrystallized with the hexane/ethyl acetate mixed solvent. An optically pure benzoyloxymethyl(tert-butyl)methylphosphine-borane was thus obtained. The yield amount was 2.34 g and the yield was 62%.

Then, a potassium hydroxide (4.0 g, 72 mmol) dissolved in 15 mL of water was dropped in a solution in which the benzoyloxymethyl(tert-butyl)methylphosphine-borane (99% ee, 6.05 g, 24.0 mmol) was dissolved in 25 mL of ethanol. The hydrolysis was completed in about 1 hour. The reaction mixture liquid was diluted with water, and three times extracted with ether. The extract was washed with a saturated brine, and dehydrated with sodium sulfate. The solvent was removed by a rotary evaporator, and the residue was refined by column chromatography of silica gel (mobile phase: hexane/ethyl acetate=3/1) to thereby obtain an (S)-tert-butyl(hydroxymethyl)methylphosphine-borane. The obtained compound was dissolved in 72 mL of acetone. The acetone solution was slowly added, in the state of the solution being vigorously stirred, to an aqueous solution (0° C.) in which potassium hydroxide (13.5 g, 240 mmol), potassium persulfate (19.4 g, 72.0 mmol) and ruthenium trichloride trihydrate (624 mg, 2.4 mmol) were dissolved in 150 mL of water. After an elapse of 2 hours, the reaction mixture liquid was neutralized with a 3M hydrochloric acid, and three times extracted with ether. The extract was washed with a saturated brine, and dehydrated with sodium sulfate. The solvent was removed at room temperature by a rotary evaporator, and the residue was refined by column chromatography of silica gel (mobile phase: pentane/ether=8/1). An (S)-tert-butylmethylphosphine-borane (purity: 98.5%) was thus obtained. The yield amount was 2.27 g and the yield was 80%.

Example 1

Synthesis of (R,R)-2,3-bis(tert-butylmethylphosphino)quinoxaline (a3)

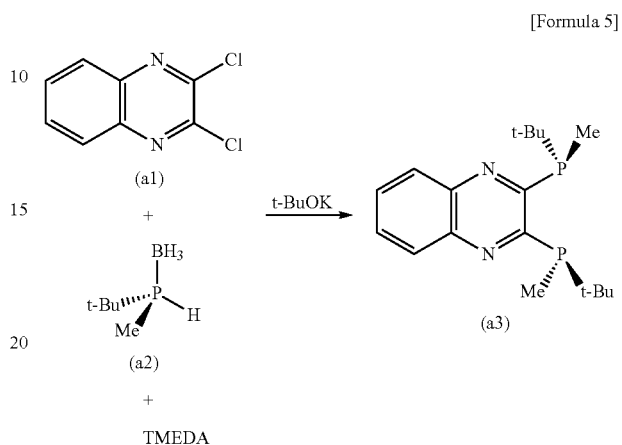

[Formula 5]

2,3-dichloroquinoxaline (a1) (1.99 g, 10 mmol) and the (S)-tert-butylmethylphosphine-borane (a2) (2.60 g, 22 mmol) were placed in a 200-ml four-necked flask with a mechanical stirrer, a dropping funnel, a thermometer and a three-way cock, and vacuuming and argon introduction were repeated to purge the system with argon. Degassed THF (20 ml) and tetramethylenediamine (7.45 ml, 50 mmol) were further added to the flask, and the flask was cooled to −20° C. A THF solution of 1.0M potassium-tert-butoxide (24.2 ml, 24.2 mmol) was dropped under much stirring therein at −16 to −9° C. over 20 min. After the finish of the dropping, the temperature was raised to room temperature over about 1.5 hours, and the resultant was allowed to stand for one night.

After the finish of the reaction, hexane (20 ml) was added to the reaction liquid, and a 2M hydrochloric acid (43 ml, 86 mmol) was added under ice-water cooling. An orange-colored organic layer was separated, and washed with water, and thereafter, the solvent was removed by an evaporator. An obtained orange-colored solid (3.46 g) was dissolved in methanol (15 ml) at 70° C., and thereafter cooled to 0° C. After 2 hours, deposited crystals were taken on a glass filter and washed with cold methanol, and thereafter vacuum dried in a desiccator to thereby obtain an (R,R)-2,3-bis(tert-butylmethylphosphino)quinoxaline (a3) (2.45 g, yield: 73%). The crystals had a purity of 97.5% in $^{31}$P NMR and an optical purity of 99.5% ee or higher.

(Identification Data of the Compound (a3))

Melting point: 102 to 103° C.

Specific rotatory power $[\alpha]^D_{26}$: −54.5 (c: 1.00, CHCl$_3$)

$^1$H NMR (500.15 MHz, CDCl$_3$): δ 1.00-1.03 (m, 18H), 1.42-1.44 (m, 6H), 7.70-7.74 (m, 2H), 8.08-8.12 (m, 2H), $^{13}$C NMR (125.76 MHz, CDCl$_3$): δ 4.77 (t, J=4.1 Hz), 27.59 (t, J=7.4 Hz), 31.90 (t, J=7.4 Hz), 129.50, 129.60, 141.63, 165.12 (dd, J=5.7, 2.4 Hz), $^{31}$P NMR (202.46 MHz, CDCl$_3$): δ −16.7 (s)

Example 2

2,3-dichloroquinoxaline (a1) (1.99 g, 10 mmol) and the (S)-tert-butylmethylphosphine-borane (a2) (2.83 g, 24 mmol) were placed in a 200-ml four-necked flask with a mechanical stirrer, a dropping funnel, a thermometer and a three-way cock, and vacuuming and argon introduction were repeated to purge the system with argon. Degassed THF (20 ml) and tetramethylenediamine (10.4 ml, 70 mmol) were further added to the flask, and the flask was cooled to 2° C. A THF solution of 1.0M potassium-tert-butoxide (25.2 ml, 25.2 mmol) was dropped under much stirring therein at a held temperature of 4° C. over 30 min. After the finish of the dropping, the temperature was raised to room temperature (25° C.) over about 1 hour, and the resultant was continuously stirred as it was for 3 hours.

Then, hexane (20 ml) was added to the reaction liquid, and a 2M hydrochloric acid (62 ml, 124 mmol) was added under ice-water cooling. An orange-colored organic layer was separated, and washed with water, and thereafter, the solvent was removed by an evaporator. An obtained orange-colored solid (3.60 g) was dissolved in methanol (16 ml) at 70° C., and thereafter cooled to 0° C. After 2 hours, deposited crystals were taken on a glass filter and washed with cold methanol, and thereafter vacuum dried in a desiccator to thereby obtain an (R,R)-2,3-bis(tert-butylmethylphosphino)quinoxaline (a3) (2.41 g, yield: 72%). The crystals had a purity of 99.7% in $^{31}$P NMR and an optical purity of 99.5% ee or higher.

(Identification Data of the Compound (a3))
Melting point: 102 to 103° C.
Specific rotatory power $[\alpha]^D_{26}$: −54.7 (c: 1.00, CHCl$_3$)
$^1$H NMR (500.15 MHz, CDCl$_3$): δ 1.00-1.03 (m, 18H), 1.42-1.44 (m, 6H), 7.70-7.74 (m, 2H), 8.08-8.12 (m, 2H),
$^{13}$C NMR (125.76 MHz, CDCl$_3$): δ 4.77 (t, J=4.1 Hz), 27.59 (t, J=7.4 Hz), 31.90 (t, J=7.4 Hz), 129.50, 129.60, 141.63, 165.12 (dd, J=5.7, 2.4 Hz),
$^{31}$P NMR (202.46 MHz, CDCl$_3$): δ −16.7 (s)

Comparative Example 1

Synthesis of (R,R)-2,3-bis(tert-butylmethylphosphino)quinoxaline (a3)

[Formula 6]

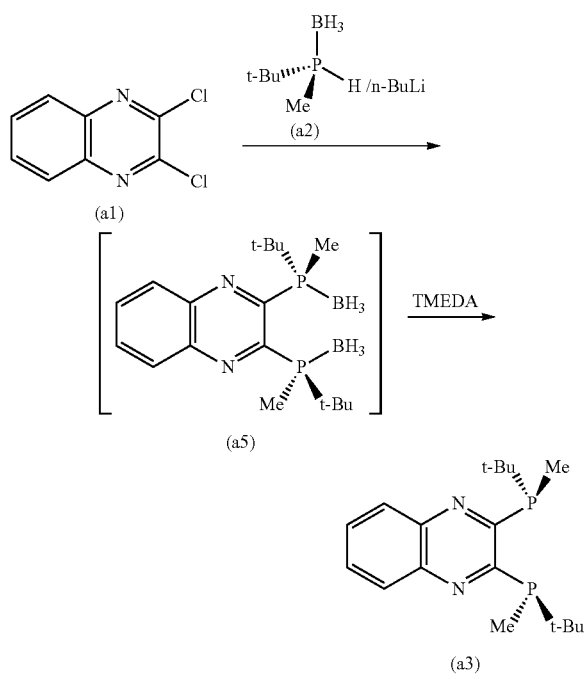

After a sufficiently dried 300-mL four-necked flask was purged with nitrogen, a tetrahydrofuran solution of 14.2% by weight of the (S)-tert-butylmethylphosphine-borane (a2) (111.46 g, 135.0 mmol) prepared in the above was placed in the flask; the flask was cooled to −10° C. in the nitrogen atmosphere; and thereafter, a hexane solution of 15% by weight of n-butyllithium (59.3 g) was dropped therein over 1 hour. Then, the resultant was aged at −10° C. for 1 hour, and termed liquid b.

A sufficiently dried 2000-mL four-necked flask was separately provided and was purged with nitrogen, and then 2,3-dichloroquinoxaline (a1) (8.97 g, 45.0 mmol), tetrahydrofuran (81 ml) and N,N-dimethylformamide (90 ml) were placed in the flask and the flask was cooled to −10° C., and the resultant was termed liquid a.

The liquid a was added to the liquid b over 20 min so that the internal temperature was maintained at about −10° C. The color of the resultant slurry changed from white to green for a while, and finally turned reddish brown.

After the finish of the dropping, the temperature was slowly raised to room temperature, and thereafter, the resultant was aged for 3 hours. Then, tetramethylenediamine (52.6 g, 450 mmol) was added and the aging was continued for one night, whereby the deboranation reaction sufficiently progressed and the resultant turned to an orange-colored slurry.

Then, the reaction was stopped by adding 180 mL of a 10% hydrochloric acid and a water layer was discarded. Then, the reaction liquid was washed by further adding 45 mL of water and 17 mL of a 5% hydrochloric acid, and a water layer was discarded. Then, the reaction liquid was washed by adding 45 mL of a 2.5% bicarbonate aqueous solution and 45 mL of water in order, and a water layer was discarded; and the solvent was distilled away by using a vacuum pump, whereby the resultant whole was solidified. After 90 mL of methanol was added and the temperature was raised to completely dissolve the solid, the resultant was slowly cooled, whereby orange-colored crystals were deposited. After the crystals were rinsed with cold methanol, and thereafter dried under reduced pressure to thereby obtain 6.6 g (yield: 44%) of an (R,R)-2,3-bis(tert-butylmethylphosphino)quinoxaline (a3). The crystals had a purity of 99.4% in $^{31}$P NMR and an optical purity of 99.5% ee or higher.

Example 3

Synthesis of bis(2,3-bis(tert-butylmethylphosphino)quinoxaline) Gold(I) Chloride (4a)

The (R,R)-2,3-bis(tert-butylmethylphosphino)quinoxaline (a3) (1.37 g, 4.1 mmol) prepared in Example 1 and 55 mL of degassed THF were added to a 125-ml two-necked flask purged with nitrogen gas. Tetrabutylammonium gold(I) dichloride (1.04 g, 2.05 mmol) was added thereto, and stirred at room temperature for 20 hours. A precipitate was filtered off and the filtrate was dried up. An obtained brown solid was dried under reduced pressure to thereby obtain 1.85 g of bis(2,3-bis(tert-butylmethylphosphino)quinoxaline) gold(I) chloride (4a) represented by the following formula (4a). The yield at this time was 98%.

(Identification Data of the Compound (4a))
$^{31}$P NMR (CDCl$_3$): 13.6
$[\alpha]^D = +195.3$ (c=0.5, methanol, 25° C.)

[Formula 7]

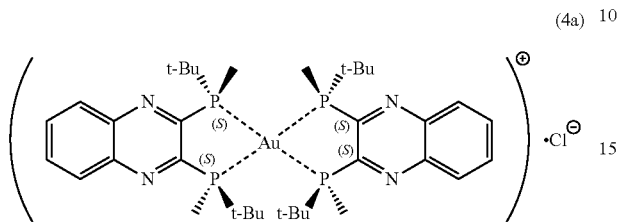
(4a)

The invention claimed is:

1. A process for preparing a compound represented by formula (3):

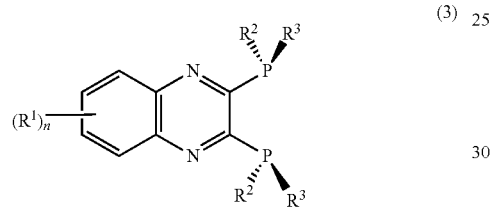
(3)

wherein:
each R$^1$ independently represents F, Cl, Br, I, C$_{1-5}$ alkyl, NH$_2$, NO$_2$, or OH;
each R$^2$ independently represents CH$_3$, CH$_2$CH$_3$, CH(CH$_3$)$_2$, (CH$_2$)$_2$CH$_3$, CH$_2$CH(CH$_3$)$_2$, CH(CH$_3$)CH$_2$CH$_3$, C(CH$_3$)$_3$, (CH$_2$)$_5$CH$_3$, (CH$_2$)$_3$CH(CH$_3$)$_2$, (CH$_2$)$_6$CH$_3$, (CH$_2$)$_4$CH(CH$_3$)$_2$, cycloalkyl, adamantyl, or phenyl;
each R$^3$ independently represents CH$_3$, CH$_2$CH$_3$, CH(CH$_3$)$_2$, (CH$_2$)$_2$CH$_3$, CH$_2$CH(CH$_3$)$_2$, CH(CH$_3$)CH$_2$CH$_3$, C(CH$_3$)$_3$, (CH$_2$)$_5$CH$_3$, (CH$_2$)$_3$CH(CH$_3$)$_2$, (CH$_2$)$_6$CH$_3$, (CH$_2$)$_4$CH(CH$_3$)$_2$, cycloalkyl, adamantyl, or phenyl; and
n represents 0;

comprising the following step of:
adding potassium tert-butoxide to a solution comprising:
(i) a compound represented by formula (1):

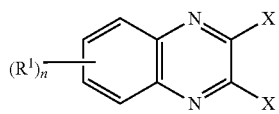
(1)

wherein:
each X independently represents Cl, Br, or I;
each R$^1$ independently represents F, Cl, Br, I, C$_{1-5}$ alkyl, NH$_2$, NO$_2$, or OH; and
n represents 0;
(ii) a compound represented by formula (2):

(2)

wherein:
R$^2$ represents CH$_3$, CH$_2$CH$_3$, CH(CH$_3$)$_2$, (CH$_2$)$_2$CH$_3$, CH$_2$CH(CH$_3$)$_2$, CH(CH$_3$)CH$_2$CH$_3$, C(CH$_3$)$_3$, (CH$_2$)$_5$CH$_3$, (CH$_2$)$_3$CH(CH$_3$)$_2$, (CH$_2$)$_6$CH$_3$, (CH$_2$)$_4$CH(CH$_3$)$_2$, cycloalkyl, adamantyl, or phenyl; and
R$^3$ represents CH$_3$, CH$_2$CH$_3$, CH(CH$_3$)$_2$, (CH$_2$)$_2$CH$_3$, CH$_2$CH(CH$_3$)$_2$, CH(CH$_3$)CH$_2$CH$_3$, C(CH$_3$)$_3$, (CH$_2$)$_5$CH$_3$, (CH$_2$)$_3$CH(CH$_3$)$_2$, (CH$_2$)$_6$CH$_3$, (CH$_2$)$_4$CH(CH$_3$)$_2$, cycloalkyl, adamantyl, or phenyl;
(iii) a liquid solvent selected from the group consisting of tetrahydrofuran, N,N-dimethylformamide, cyclopentyl methyl ether, diethyl ether, dibutyl ether, dioxane, hexane, and toluene, or a combination thereof; and
(iv) a deboronating agent selected from the group consisting of N,N,N',N'-tetramethylethylenediamine, triethylenediamine, and triethylamine.

2. The process according to claim 1, wherein the compound represented by formula (2) is:

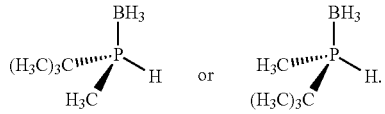

3. The process according to claim 1, wherein the compound represented by formula (3) is:

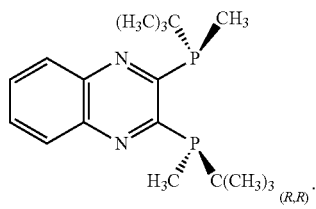 [SMILES: C[P@@](c1nc2ccccc2nc1[P@](C)C(C)(C)C)C(C)(C)C]

4. The process according to claim 1, wherein the addition is performed at a temperature in the range of −25° C. to 100° C.

* * * * *